United States Patent Office 2,754,073
Patented July 10, 1956

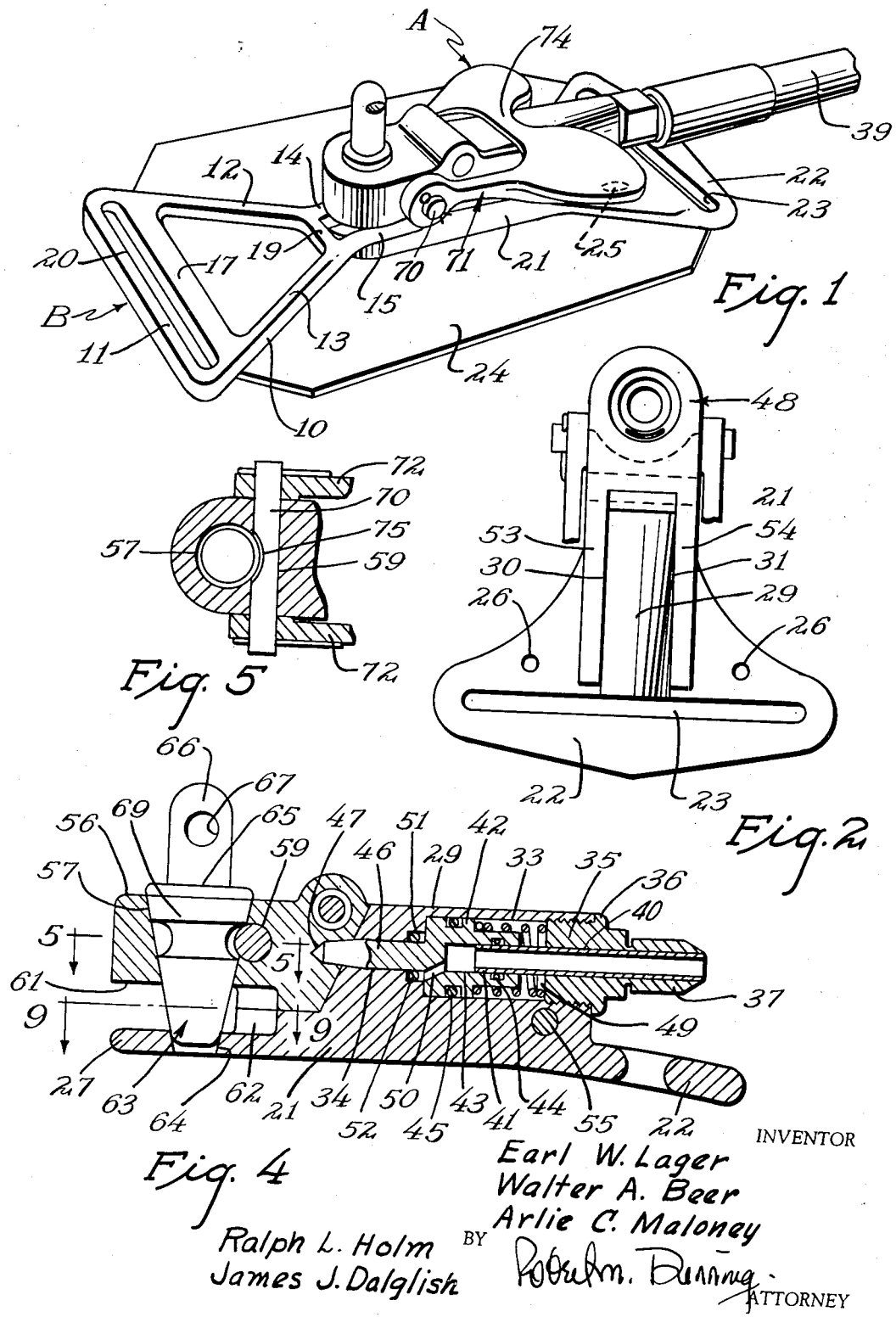

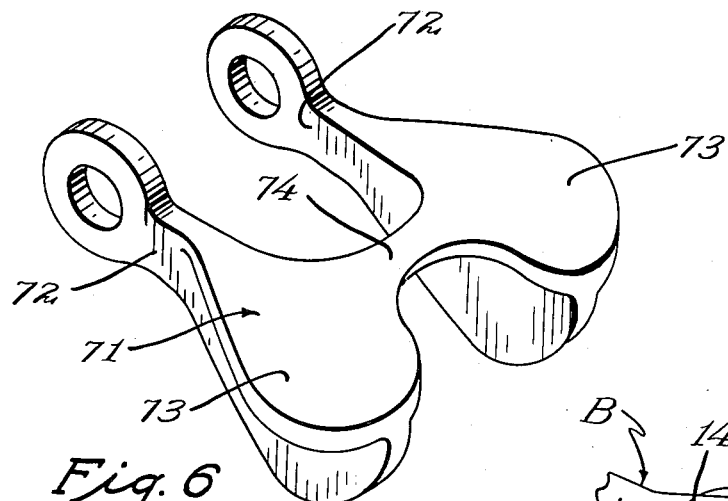
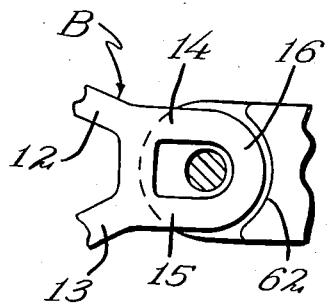
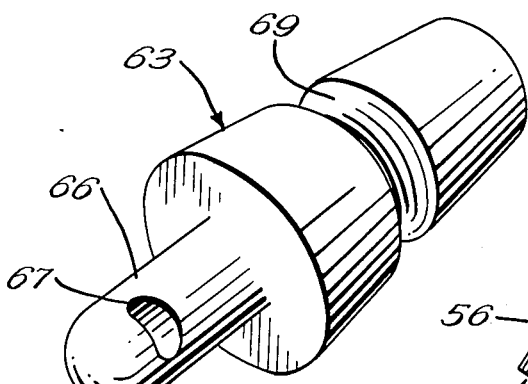
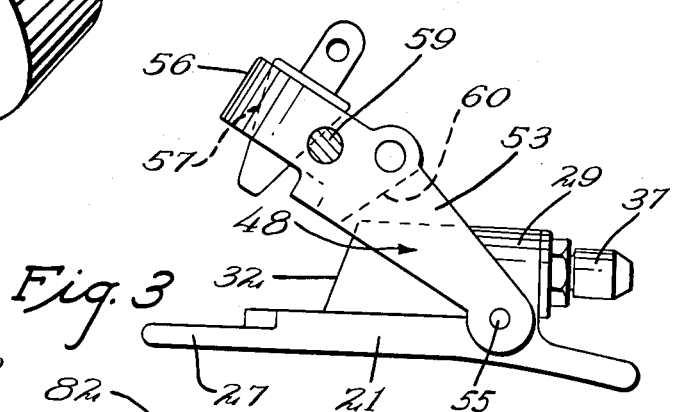
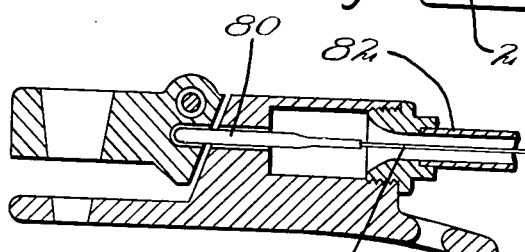

2,754,073
QUICK DETACHABLE HARNESS

Ralph L. Holm, Minneapolis, James J. Dalglish, Earl W. Lager, and Walter A. Beer, St. Paul, and Arlie C. Maloney, Minneapolis, Minn.

Application February 3, 1954, Serial No. 407,825

16 Claims. (Cl. 244—122)

This invention relates to an improvement in quick detachable harness latch and deals particularly with a latch for harness used by airplane pilots and the like.

In high speed planes it has become common practice to provide a means for automatically ejecting the pilot from the plane in an emergency to project the pilot clear of the plane. When it becomes necessary to eject the pilot, means is provided for disconnecting the harness which holds the pilot to the seat. Usually the seat is ejected with the pilot and the pilot becomes disengaged from the seat in the air. As the force of the propulsion is likely to cause momentary unconsciousness of the pilot, the process must be automatic and means must be provided for opening the parachute worn by the pilot as the pilot becomes disengaged from the seat.

In order that the harness be conveniently used it is necessary that the structure be manually operable so that the belt may be attached and detached manually as the pilot enters or leaves the plane. As the parachute is usually strapped to the pilot before the pilot enters the plane it is necessary that opening mechanism be detachably connected to the seat belt or harness. It is also desirable and at present obligatory that the key connected to the parachute opening mechanism form a part of the harness latch so that this key must be in place in order that the latch function. Thus, it is a feature of the present invention to provide a quick detachable latch which relies upon the parachute key as a part of its structure and will not function to serve its intended purpose unless the key is in place.

One of the difficulties with most devices of the type described lies in the complicated nature of the structure and the number of separate operations which must be performed in order to operate the fastener. It is a feature of the present invention that the structure is extremely simple in character and requires a minimum of operations to open and close. In closing the fastener it is only necessary to draw the harness about the body, move the detachable portions of the harness into proper relationship, insert the parachute key, and pivot the latch locking lever. In manually opening the fastener it is only necessary to operate the locking lever whereupon the parachute key as well as the connectable portions of the harness are released.

A feature of the present invention lies in the use of the parachute key as a lug for holding the detachable portions of the harness connected. Accordingly, when the parachute key is not in place the disconnectable parts of the harness cannot be connected. However, when the parachute key is in place the disconnectable parts of the harness are firmly joined.

A further feature of the present invention lies in the simple means provided for automatically disconnecting the harness following ejection of the seat. The latch includes a base part and a hinged arm including a latch bolt end which may swing away from the base part to disconnect the harness. The hinged arm is normally held in latching position by a removable pin connected to a piston slidable in a cylinder. Immediately following the seat ejection, a cartridge is fired, sending a blast of high pressure gas into cylinder, moving the piston and disengaging the locking pin. The hinged arm of the latch may then swing open to release the connection in the harness.

A further feature lies in the provision of a novel lock for holding the parachute key connected to the latch. The key fits into a socket in the latch. A cross shaft intersects one side of this socket, and is notched to correspond to the shape of the socket. The key contains a peripheral groove into which the cross shaft extends in locked position of the key. The notch in the cross shaft may be pivoted into registry with the socket walls to permit engagement or disengagement of the key.

A further feature of the present invention resides in the particular manner in which the gases operate against the piston. The gases are transmitted through a hollow portion of the piston, and through the piston head to a larger area on the forward face of the plunger. As a result gases entering the piston through the open end act to force the piston in the opposite direction to disengage the locking pin so that the latch may open.

These and other objects and novel features of the invention will be more clearly and fully set forth in the following specification and claims.

Figure 1 is a perspective view of the quick detachable connector showing the general arrangement of parts thereof.

Figure 2 shows one part of the connector in readiness for connection with the other part thereof.

Figure 3 is a side elevational view of the connector portion shown in Figure 2, the connector being shown in open position.

Figure 4 is a longitudinal sectional view through the portion of the connector shown in Figures 2 and 3.

Figure 5 is a transverse sectional view of a portion of the fastener, the position of the section being indicated by the line 5—5 of Figure 4.

Figure 6 is a perspective view of the locking lever used for manual operation of the latch.

Figure 7 is a perspective view of the parachute key removed from the latch.

Figure 8 is a sectional view similar to Figure 4, showing a modified form of construction.

Figure 9 is a sectional view through a portion of the fastener showing the manner in which the disconnectable parts fit together.

Figure 10:
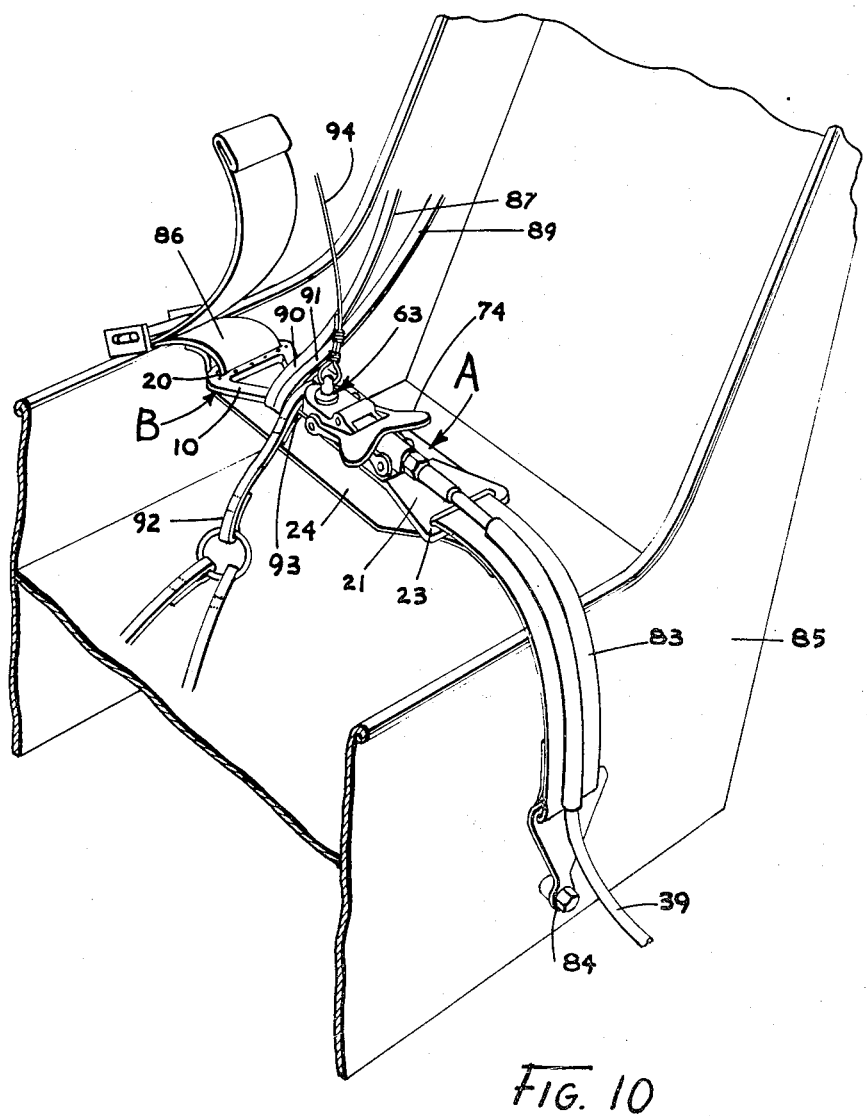
Figure 10 is a diagrammatic perspective view showing the general arrangement of the seat belt and its quick detachable fastener in combination with the straps and cords used therewith.

The latch is indicated in general by the letter A and is used in conjunction with a harness or belt clip B. The clip B includes a generally triangular frame 10 having an end bar 11 and inwardly converging sides 12 and 13. The sides 12 and 13 extend to form parallel sides 14 and 15 respectively which are connected by a rounded loop 16. Cross members 17 and 19 serve to reinforce the structure and the cross member 17 is spaced from the end bar 11 to provide a slot 20 through which the seat belt or harness belt may be fastened.

The latch A also includes a body portion 21 having an enlarged end 22 provided with a slot 23 therein to accommodate the other end or cooperable portion of the seat belt or harness belt. A guard plate 24 of leather or other suitable material underlies the body portion 21 and is secured thereto by rivets 25 extending through openings 26 in the enlarged body portion 22. The guard plate 24 extends between the fastener and the apparel worn by the pilot so as to prevent interference with the operation of the device and to make the fastener more comfortable to wear.

The body portion 21 is shown in Figures 3 and 4 as having a projection 27 forming a curved or angular extension of the enlarged base portion 22 and at the end of the body portion opposite that bearing the slot 23. The body portion 21 also includes, intermediate its side edges, an upwardly projecting barrel 29 having substantially parallel sides 30 and 31 extending longitudinally of the fastener. As also indicated in these figures the end 32 of the barrel 29 is inclined so that the pivoted portion of the fastener may swing into open position.

As shown in Figure 4 the barrel 29 includes a longitudinal cylinder or socket 33 which communicates with a smaller diameter axial bore 34. A plug 35 is threaded into the open end of the socket 33 and includes a flange 36 arranged to seal against the end of the barrel 29. The plug 35 is provided with a projecting nipple 37 or other fitting so that the plug may be connected to a flexible tube 39 shown in Figure 1.

The plug 35 is provided with a passage 40 extending therethrough, this passage also extending through a sleeve 41 integral with the plug and projecting into the socket 33. A piston 42 is slidable within the socket 33 and includes an axial socket 43 which fits about the sleeve 41 with a sliding fit. An O-ring 44 encircles the sleeve 41 and fits within a suitable groove in the inner surface of the piston 42 so that a seal is provided between the sleeve 41 and the piston 42. A similar O-ring 45 fits within an external groove on the piston 42 and acts as a seal between the piston 42 and the socket 33.

The piston 42 is provided with a projecting pin 46 which slides within the recess 34. The extremity of the pin 46 is bevelled or cone shaped as indicated at 47 so as to simplify the release of the locking action of the pin as will be later described.

A spring 49 is interposed between the piston 42 and plug 35 to normally urge the pin 46 into projecting position. One or more holes 50 are provided through the head or end of the piston 42 and communicating with a circular area 51 encircling the pin 46. An O-ring 52 encircles the pin 46 to form a seal between the pin and the barrel 29.

The fastener A also includes a pivoted latch arm 48 which straddles the barrel 29. This arm includes a pair of parallel arms 53 and 54 which extend on opposite sides of the barrel 29. A pivot 55 extends through the arms 53 and 54 and through the barrel 29 below the level of the socket 33. The arms 53 and 54 are connected by a body portion 56 having a tapered aperture 57 therethrough, the axis of the aperture being substantially on the plane longitudinally through the fastener and normal to the axis of the pivot 55. The body portion 56 also includes a transverse aperture 59 which intersects the tapered aperture 57 to a relatively minor degree. In other words the axis of the aperture 59 does not intersect the aperture 57 but the two apertures partially intersect as is clearly visible in Figures 3, 4, and 5, of the drawings.

The end of the body portion 56 nearest the pivot 55 is inclined as indicated at 60 to fit the form and shape of the inclined end 32 of the barrel 29. When the pivoted latch member is in closed position as is shown in Figure 4 the surfaces 60 and 32 are substantially in surface contact. However, the shape is such that the latch member may swing away from the base portion of the fixed portion 21 of the latch as shown in Figure 3. Furthermore, the incline of the wall 60 may be such as to act as a cam to retract the pin 46 as the pivoted latch swings into closed position. The cone shaped end 47 of the pin 46 assists this action.

The undersurface of the body portion 56 is notched as shown at 61, the notch being similar in shape to the projecting portion 27 of the connector member 21. The connector portion 21 and the end of the notch 61 form an arcuate wall 62 to freely receive the rounded end 16 of the belt or harness connector B. The wall 62 limits the insertion of the connecting portion B and properly locates this portion to simplify the operation of connecting the belt.

A parachute key 63 (shown in detail in Figure 7) is designed to fit into the tapered aperture 57, the end of the key 63 extending into a cooperable opening 64 in the projection 27. The key 63 is tapered to fit the recess 57. An axial projection 66 is provided on the key 63 which is apertured at 67 to accommodate a cord connected to suitable mechanism for opening a parachute. The key 63 is provided with a peripheral groove 69 at the level of the intersecting aperture 59.

As shown in Figure 5 a pin 70 is pivotally supported in the aperture 59. The pin 70 preferably extends entirely through the latch arm 48. A bifurcated lever 71 (shown in detail in Figure 6) includes parallel arms 72 including laterally extending wings or fins 73 and a connecting web 74. The pin 70 extends through the arms 72 and is pinned or otherwise connected thereto to rotate therewith. The enclosed portion of the pin 70 is provided with an arcuate notch 75 which coincides with the shape of the tapered aperture 57 in one pivoted position of the pin 70. Thus, when the pin 70 is in the position shown in Figure 5 the parachute key 63 may be inserted or removed. However, when the pin 70 is pivoted into the position shown in Figure 1 to extend longitudinally of the fastener, the pin extends into the groove 69 of the parachute key therein, locking the key from disengagement with the fastener. In other words when the lever 71 is in the locking position shown in Figure 1 and Figure 4 the key 63 is held engaged in the aperture 57.

The operation of the device is as follows:

The plane is provided with a seat for the pilot which is detachable from the plane and which may be ejected from the cockpit of the plane when an emergency is experienced. The seat is equipped with a safety belt or harness and the fastener A is provided to hold this harness in body encircling position.

At one end of the belt or harness the latch A is connected, and the buckle or fastener portion B is mounted at the other end of the harness. The cylinder 33 is connected through the plug 35 and nipple 37 and tubular connection 39 to a cartridge which is usually fired after ejection of the seat by a suitable time delay mechanism.

Before entering the plane the pilot usually attaches his parachute, the opening mechanism of which is provided with a cord to which is fastened the key 63. Upon entering the plane the pilot draws the seat belt or harness about him and inserts the belt clip B into its socket. The key 63 is then inserted into the aperture 57 while the lever 71 is pivoted upwardly, this motion aligning the notch 75 in the shaft 70 with the inner wall of the aperture 57. The lever 71 is then swung downwardly into closed position as shown in Figure 1. The laterally extending wings 73 make operation possible even when the pilot is wearing heavy gloves. The parachute key 63 engages the looped end 16 of the belt clip B and holds the belt in body encircling position.

Under normal circumstances, at the end of the flight the pilot pivots the lever 71 upwardly until the parachute key 63 may be removed. Removal of the parachute key 63 unfastens the belt and permits the two ends of the belt to be drawn aside so that the pilot may leave the plane.

In the event it becomes necessary to leave the plane in flight, the pilot performs the proper operations to eject the seat from the plane. As the seat is ejected gas under pressure is forced through the tubular connection 39 and into the hollow interior 43 of the piston 42. This gas is also forced through one or more apertures 50 through the head of the piston to exert a greater force on the outside of the piston than is exerted from the inside thereof, thus forcing the piston to the right of the position shown in Figure 4. Movement of the piston to the right acts to retract the pin 46 from the socket in the inclined surface 60 of the fastener so as to permit the hinged portion of the fastener to move away from the base portion thereof. The tapered key 63 acts as a cam surface so that a pull upon the seat belt tends to swing the fastener into the position shown in Figure 3. As the cartridge is sealed in relation to the tube 39, the pin 46 remains retracted for several seconds. The pivoting of the arm 48 unfastens the belt but retains the parachute key connected to the seat belt.

The taper of the key, at least on the surface thereof against which the clip 10 engages, is of utmost importance. Without this taper, there would be no force tending to open the fastener when the trigger pin 46 was retracted. Thus it is important that the apertured end of the clip 10 engage a surface which is at an obtuse angle to the direction of pull between the fastener members.

As the flyer moves away from the seat, key 63 exerts a pull upon the connected cord to the parachute opening mechanism which automatically opens the parachute. Thus the opening of the parachute and the disengagement of the pilot from the seat is automatic so that these actions will take place even though the pilot is stunned or only partially conscious.

In Figure 8 we disclose a modified form of construction which may be operated by a lanyard or static line. The latch may also be operated mechanically, pneumatically, or hydraulically, and the pin 80 (similar to the pin 46 in its locking operation) is connected to a lanyard or static line 81 extending through the tubular connection 82 to be anchored to the plane. In this case, the pin 80 is withdrawn by the line or lanyard 81 as the seat is ejected. This arrangement is practical where the plane design is such that the pilot does not have to be ejected a substantial distance to clear the rear of the plane, or may be used where the seat drops from the bottom of the plane.

It will be seen that the parachute key serves the double purpose of providing a detachable latch and forming the means of holding the seat belt fastened. It is obvious that the seat belt cannot be fastened unless the key is in place as the key forms the means of connecting the fastener with the belt clip. Similarly the arrangement simplifies the entire operation as the entire operation of fastening the seat belt and attaching the parachute key are simultaneously accomplished.

A typical belt arrangement is shown in Figure 10 of the drawings. This figure shows a belt section 83 which may be adjustably anchored at 84 to the pilot's seat 85 and extending through the slot 23 in the body portion 21 of the fastener. A second belt section 86 is similarly anchored to the seat 85 and extends through a slot 20 in the body frame 10 of the clip B.

Shoulder straps such as 87 and 89 have looped ends 90 and 91 encircling the frame 10 of the clip B. A lap belt hold down strap structure 92 is provided with a looped end 93 also encircling the frame 10. A parachute cord 94 is attached to the key 63. This cord is connected to a mechanism which automatically opens the parachute when the pilot descends to a predetermined altitude. The tubular connection 82 containing the lanyard or static line 81 may be terminally anchored to the plane, or may extend to a suitable time delay mechanism for releasing the fastener, if the arrangement shown in Figure 8 is used. Alternatively, the conduit 39 may extend to a mechanism started into action as the seat is ejected and releasing the fastener after a predetermined time delay, after the seat and pilot have been ejected.

During manual attachment of the belt, the various straps are looped over the clip B before the clip is inserted into its socket in the fastener A and the key inserted. When the key is removed, the straps slide from the clip. If the pilot is ejected from the plane, the fastener opens, releasing the clip B and allowing the straps to slip from place.

In accordance with the patent statutes, we have described the principles of construction and operation of our quick detachable harness latch, and while we have endeavored to set forth the best embodiment thereof, we desire to have it understood that obvious changes may be made within the scope of the following claims without departing from the spirit of our invention.

We claim:

1. A detachable fastener for use in connecting the ends of a belt including a divided seat belt, a belt clip connected to one end of the belt and a fastener body attached to the other end of the belt, said belt clip having an aperture therethrough, said fastener body having a socket therein designed to accommodate the apertured portion of said belt clip, a socket in said fastener body, and a parachute key inserted in said socket and extending through the aperture in the belt clip when engaged in its socket, the parachute key being tapered in form.

2. A quick detachable fastener for use in fastening two belt ends together, the fastener including a belt clip adapted to be secured to one of said belt ends, a fastener body adapted to be attached to the other belt, said belt clip having an apertured end and said body having a slot extending longitudinally of the belt ends and into which said apertured end of said belt clip may extend, said body having a transversely extending aperture therein intersecting said slot and designed to accommodate a parachute key, a parachute key detachably engaged in said aperture in said body and said key extending through said aperture in said belt clip.

3. The construction described in claim 2 and including manually operable means for holding said key engaged in its socket.

4. The construction described in claim 2 and in which said fastener body includes two pivotally connected parts on opposite sides of said belt clip received socket, said parachute key being detachably connected to one of said pivotally connected parts.

5. A quick detachable fastener for use in connecting a pair of belt ends, the fastener including a belt clip adapted to be attached to one of said belt ends, and a fastener body adapted to be secured to the other of said belt ends, a socket in said fastener body designed to accommodate a portion of said belt clip, said fastener body including two pivotally connected parts, said socket extending through both said parts, a pin slidably supported in one of said parts and engageable in a recess in the other of said parts to hold said parts from relative pivotal movement, a piston connected to said pin and having a hollow interior for the accommodation of gas under pressure, said piston having an outer end surface and an opposed inner end surface, said piston having passages connecting said end surfaces and through which gas may flow, said outer end surface being larger than the inner end surface whereby the gas will exert a greater force against the outer end surface of the piston than may be exerted upon the inner end surface thereof, and means for holding said belt clip engaged in said socket.

6. The structure described in claim 5 and in which the means holding the belt clip engaged in the socket comprises a key removably secured to one of said parts.

7. The construction described in claim 5 and in which the means for securing the belt clip in said socket includes a removable key, and means securing said key to one of said pivotal parts for movement therewith.

8. The construction described in claim 5 and including means for normally urging said piston in one direction.

9. The construction described in claim 5 and in which the means holding the parachute key in place comprises a pin intersecting the key socket and a groove in the key for accommodating said pin.

10. A quick detachable fastener for use in connecting a pair of belt ends, the fastener including a belt clip attached to one belt end, and a fastener body connected to the other belt end, said fastener body including a pair of pivotally connected parts between which the belt clip may extend, a parachute key removably secured to one pivotally connected part of said fastener body and designed to engage said belt clip to hold the belt clip connected to the fastener body, a pin slidably supported in one fastener body part and engaging the other fastener body part to hold the two parts from relative pivotal movement, and means secured to said pin and operable to withdraw said pin.

11. A fastener designed to connect a pair of belt ends, the fastener including a first fastener member adapted to be connected to one belt end, a second fastener member adapted to be connected to the other belt end, the first fastener member including a slotted end, said end having an aperture therein designed to accommodate a parachute key intersecting the slot, the second fastener member having an apertured end through which said key may extend, said key being tapered and said apertured end of said second fastener engaging a surface of said key which is at an obtuse angle to the direction of pull between said fastener members, whereby a tendency to pull said fastener members apart creates a force tending to force said key from said aperture, and manually operable means for locking said key in said aperture.

12. A fastener designed to connect a pair of belt ends, the fastener including a first fastener member adapted to be connected to one belt end, a second fastener member adapted to be connected to the other belt end, the first fastener member including a slotted end, said end having an aperture therein designed to accommodate a parachute key intersecting the slot, the second fastener member having an apertured end through which said key may extend, said key being tapered and said apertured end of said second fastener engaging a surface of said key which is at an obtuse angle to the direction of pull between said fastener members, whereby a tendency to pull said fastener members apart creates a force tending to force said key from said aperture, and manually operable means for locking said key in said aperture, said first fastener member including two relatively pivotal parts, one of which extends on each side of the slot in said slotted end, and including removable trigger means holding said relatively pivotal parts from pivotal motion.

13. A fastener designed to connect a pair of belt ends, the fastener including a first fastener member adapted to be connected to one belt end, a second fastener member adapted to be connected to the other belt end, the first fastener member including a slotted end, said end having an aperture therein designed to accommodate a parachute key intersecting the slot, the second fastener member having an apertured end through which said key may extend, said key being tapered and said apertured end of said second fastener engaging a surface of said key which is at an obtuse angle to the direction of pull between said fastener members, whereby a tendency to pull said fastener members apart creates a force tending to force said key from said aperture, and manually operable means for locking said key in said aperture, said first fastener member including two relatively pivotal parts which extend on opposite sides of the slot in said slotted end, one of said pivotal parts supporting said key, and including releasable trigger means engageable between said parts to hold the same from pivotal movement.

14. A fastener designed to connect a pair of belt ends, the fastener including a first fastener member adapted to be connected to one belt end, and a second fastener member adapted to be connected to the other belt end, the first fastener member including a base part and a clamping plate part, a pivot connecting said parts on an axis transverse to the longitudinal axis of said fastener members when connected, a releasable trigger member interposed between said parts and normally holding the same from relative pivotal movements, portions of said parts remote from said pivot being spaced, the other fastener member including a portion extendable between said spaced portions of said parts, one of said parts having an aperture therethrough, a parachute key extendable through said aperture and bridging said spaced portions of said parts, said second fastening member having an aperture therein into which said key may extend to hold said members connected, and manually operable locking means for holding said key in said aperture.

15. The structure described in claim 14 and in which said key includes a surface engageable with said second fastener member arranged on an angle at an obtuse angle to direction of pull tending to separate said fastener members.

16. The structure described in claim 14 and including means supplying a force tending to pivot said base part and said clamping plate part apart.

References Cited in the file of this patent

UNITED STATES PATENTS

| | | |
|---|---|---|
| 1,895,222 | Johnson | Jan. 24, 1933 |
| 2,439,613 | Quilter | Apr. 13, 1948 |
| 2,459,223 | Henderson | Jan. 18, 1949 |
| 2,504,125 | Hight | Apr. 18, 1950 |
| 2,605,065 | Wilkins | July 29, 1952 |
| 2,665,163 | Gross | Jan. 5, 1954 |

FOREIGN PATENTS

| | | |
|---|---|---|
| 979,155 | France | Dec. 6, 1950 |